(12) United States Patent
Barkai et al.

(10) Patent No.: US 7,342,893 B2
(45) Date of Patent: Mar. 11, 2008

(54) PATH DISCOVERY IN A DISTRIBUTED NETWORK MANAGEMENT ARCHITECTURE

(75) Inventors: Sharon Barkai, Shoham (IL); Ariel Noy, Herzliya (IL); Yoel Shkolnisky, Or-Yehuda (IL)

(73) Assignee: Sheer Networks Ltd., Sunnyvale, CA (US)

( * ) Notice: Subject to any disclaimer, the term of this patent is extended or adjusted under 35 U.S.C. 154(b) by 925 days.

(21) Appl. No.: 09/919,845

(22) Filed: Aug. 2, 2001

(65) Prior Publication Data

US 2002/0027925 A1    Mar. 7, 2002

Related U.S. Application Data

(60) Provisional application No. 60/222,660, filed on Aug. 3, 2000.

(51) Int. Cl.
*H04L 12/26* (2006.01)

(52) U.S. Cl. .................. 370/245; 370/241; 370/242

(58) Field of Classification Search ............. 370/241, 370/250, 254, 241.1, 242, 252, 255, 389, 370/395.21, 295.31; 709/223, 224, 220, 709/221, 245, 230, 225, 244
See application file for complete search history.

(56) References Cited

U.S. PATENT DOCUMENTS

| 5,317,568 | A | 5/1994 | Bixby et al. |
|---|---|---|---|
| 5,758,083 | A | 5/1998 | Singh et al. |
| 5,777,549 | A | 7/1998 | Arrowsmith et al. |
| 5,928,325 | A | 7/1999 | Shaughnessy et al. |
| 5,961,594 | A | 10/1999 | Bouvier et al. |
| 5,978,845 | A | 11/1999 | Reisacher et al. |
| 6,032,183 | A | 2/2000 | Chen et al. |
| 6,035,331 | A | 3/2000 | Soga et al. |
| 6,047,320 | A | 4/2000 | Tezuka et al. |
| 6,101,541 | A | 8/2000 | Ellesson et al. |
| 6,237,034 | B1 | 5/2001 | Fulford |
| 6,247,052 | B1 | 6/2001 | Huang et al. |
| 6,247,056 | B1 | 6/2001 | Chou et al. |
| 6,425,004 | B1 * | 7/2002 | Hardjono ............... 709/223 |
| 6,442,615 | B1 * | 8/2002 | Nordenstam et al. ...... 709/241 |
| 6,549,882 | B1 * | 4/2003 | Chen et al. ............. 703/21 |
| 6,687,748 | B1 * | 2/2004 | Zhang et al. ........... 709/223 |
| 6,728,214 | B1 * | 4/2004 | Hao et al. ............. 370/241 |
| 6,832,184 | B1 * | 12/2004 | Bleier et al. ........... 703/23 |

(Continued)

OTHER PUBLICATIONS

Hutchinson N.C., et al., "The X-Kernel: An Architecture For Implementing Network Protocols", IEEE Transactions on Software Engineering, IEEE Service Center, Los Alamitos, CA, USA, vol. 17, No. 1, Jan. 1991, pp. 64-75.

(Continued)

*Primary Examiner*—Wing Chan
*Assistant Examiner*—Mark A. Mais
(74) *Attorney, Agent, or Firm*—AlphaPatent Associates Ltd.; Daniel J. Swirsky

(57) ABSTRACT

A method of determining a communications path in a computer network, the method including sending a simulated network message within a model of the computer network from a source device component within the model to a destination device component within the model along a device component path, where the message does not traverse the computer network, and recording the device components traversed by the message, thereby determining the communications path.

8 Claims, 7 Drawing Sheets

U.S. PATENT DOCUMENTS

| | | | |
|---|---|---|---|
| 6,845,352 B1 * | 1/2005 | Wang | 703/24 |
| 6,915,344 B1 * | 7/2005 | Rowe et al. | 709/224 |
| 6,990,518 B1 * | 1/2006 | Secer | 709/223 |
| 7,000,014 B2 * | 2/2006 | Poisson et al. | 709/224 |
| 7,020,716 B2 * | 3/2006 | Raval et al. | 709/237 |
| 7,065,548 B2 * | 6/2006 | van Oldenborgh et al. | 709/201 |
| 7,242,671 B2 * | 7/2007 | Li et al. | 370/254 |

OTHER PUBLICATIONS

Wang S Y et al., "A Simple Methodology for Constructing Extensible and High-Fidelity TCP/IP Network Simulators", Infocom '99. Eighteenth Annual Joint Conference of the IEEE Computer and Communications Societies. Proceedings. IEEE New York, NY, Mar. 21-25, 1999, Piscataway, NJ, IEEE, US, Mar. 21, 1999, pp. 1134-1143. XP010323900, vol. 3. ISBN: 0-7803-5417-6.

* cited by examiner

| DC | DC TYPE | IN STACK | CURRENT DESTINATION | OUT STACK | CURRENT DESTINATION |
|---|---|---|---|---|---|
| 508 | IP INTERFACE | EMPTY | IP 536 | EMPTY | IP 536 |
| 510 | R.E | EMPTY | IP 536 | IP 536 | IP 536 |
| 512 | IP INTERFACE | IP 536 | IP 536 | IP 536 | IP 536 |
| 514 | PPPOA | IP 536 | IP 536 | PPPOA IP 536 IP 536 | VC 9 |
| 516 | ATM | PPPOA IP 536 IP 536 | VC 9 | PPPOA IP 536 IP 536 | VC 9 |
| 518 | ATM | PPPOA IP 536 IP 536 | VC 9 | PPPOA IP 536 IP 536 | VC 9 |
| 520 | VCR | PPPOA IP 536 IP 536 | VC 9 | PPPOA IP 536 IP 536 | VC 11 |
| 522 | ATM | PPPOA IP 536 IP 536 | VC 11 | PPPOA IP 536 IP 536 | VC 11 |
| 524 | ATM | PPPOA IP 536 IP 536 | VC 11 | PPPOA IP 536 IP 536 | VC 11 |
| 526 | VCR | PPPOA IP 536 IP 536 | VC 11 | PPPOA IP 536 IP 536 | VC 14 |
| 528 | BP ATM | PPPOA IP 536 IP 536 | VC 14 | PPPOA IP 536 IP 536 | VC 14 |
| 530 | ENCAP MUX ATM | PPPOA IP 536 IP 536 | VC 14 | PPPOA IP 536 IP 536 | VC 14 |
| 532 | PPPOA | PPPOA IP 536 IP 536 | VC 14 | IP 536 | IP 536 |
| 534 | IP MUX | IP 536 | IP 536 | IP 536 | IP 536 |
| 536 | IP INTERFACE | IP 536 | IP 536 | DONE | DONE |

Fig. 6

PATH DISCOVERY IN A DISTRIBUTED NETWORK MANAGEMENT ARCHITECTURE

CROSS-REFERENCE TO RELATED APPLICATIONS

This application is related to and claims priority from U.S. Provisional Patent Application No. 60/222,660 entitled "MULTI-LAYER PATH ALGORITHM," filed Aug. 3, 2000, and incorporated herein by reference in its entirety.

FIELD OF THE INVENTION

The present invention relates to computer network management in general and more particularly to path discovery in a distributed network management architecture.

BACKGROUND OF THE INVENTION

Classic large-scale computer network architectures having hundreds or thousands of network elements, such as bridges, routers, and switches, are typically managed by a single, centralized network management server, which, by itself or possibly with the help of distributed data acquisition units, gathers information received from the network elements, through techniques such as polling or event trapping, in support of performing centralized functions such as determining the topology or operational status of the entire network or the root cause of network faults. Such centralized, hierarchical systems in which raw or formatted information is processed at a master server ultimately suffer from exhaustion of computation resources and poor response times. A necessary requirement of such centralized network management architectures is that the network management server "see" the entire network and thus be able to receive information from or regarding every element on the network and manage every such element as necessary. Other network management solutions that partition a network into multiple domains, with each domain being separately managed by a central server, do not offer a clear way of integrating cross-domain and end-to-end information, and are therefore not viewed as a full solution, or transform into a multi-hierarchy, centralized bottleneck.

Centralized network management systems suffer particularly when dealing with network surveillance and provisioning. In the event of a network fault, such as if a link between network elements falls, the fault would typically be detected by a polling unit which would then report the fault to the network management server which would determine the root cause of the fault, those network elements that are affected by the fault, and a course of action. As the number of faults increases, the increasing complexity and load of the required computation would eventually result in a failure of the central server and in faults not being handled. End-to-end provisioning and configuration requests that are carried out centrally would likewise suffer from increased multi-element multi-layer computation load and complexity. This problem is compounded in partitioned systems where part of the network suffers, as each centralized server does not see the entire network, which may be critical in handling cross-partition faults or provisioning.

Hence, computer network architectures that employ centralized network management are not easily scalable. Thus, as the number and complexity of network elements increases, and as provisioning procedures grow increasingly complex as the network diversifies, the central network management server will ultimately fail as its capacity to receive and process information from all network elements is exceeded.

SUMMARY OF THE INVENTION

The present invention seeks to provide a method for path discovery in a large-scale network management architecture using distributed autonomous agents. The distributed network management architecture includes a plurality of decentralized network management units, where each network management unit sees and is responsible for only a portion of the overall network. A software and/or hardware "agent" is defined for each network element, with each decentralized network management unit hosting those agents that correspond to the portion of the network for which the network management unit is responsible. Each agent in turn comprises a plurality of device components (DCs), with each DC modeling one or more physical and/or logical aspects of the /network element, typically with each DC bound and scoped to cover functionality which is within a single network layer. Moreover, the set of DCs comprising the agent, form published, well-defined, and addressable interfaces of each agent, which may then be easily made known and addressable to other agents.

Discovering the path a message would take in an a large-scale network management architecture using distributed autonomous agents is useful in troubleshooting or assessing the performance and efficiency of such an architecture prior to the actual transmission of messages across the physical network. For example, should the projected path for a given message be a roundabout one, the DCs involved may be reconfigured to provide a more direct path. By determining the projected path that a message will take across the physical network, the networks layers and devices the path crosses may be derived for study.

There is thus provided in accordance with a preferred embodiment of the present invention a method of determining a communications path in a computer network, the method including sending a simulated network message within a model of the computer network from a source device component within the model to a destination device component within the model along a device component path, where the message does not traverse the computer network, and recording the device components traversed by the message, thereby determining the communications path.

Further in accordance with a preferred embodiment of the present invention the method further includes providing the model including a plurality of agents, each agent corresponding to a different network element in the computer network including a plurality of network elements, and a plurality of device components (DC), each of the device components modeling at least one aspect of one of the network elements, the aspect being either of a physical and a functional characteristic of the network element, where each of the agents includes a plurality of the device components, and where at least two of the device components within at least one of the agents are logically interconnected, each logical interconnection corresponding to either of a physical and a functional interconnection found within or between any of the network elements.

Still further in accordance with a preferred embodiment of the present invention the sending step includes each device component along the device component path traversed by the message identifying an intermediate device component along the device component path to which the message is to be passed, and passing the message and an identifier of the intermediate device component to an immediately next device component.

Additionally in accordance with a preferred embodiment of the present the identifying step includes identifying in accordance with network routing rules.

Moreover in accordance with a preferred embodiment of the present invention the identifying step includes identifying the intermediate device component within the same network layer.

Further in accordance with a preferred embodiment of the present invention the method further includes receiving the message at the immediately next device component, if the message is received from a device component at a higher network layer placing information onto an information stack as may be needed by any device component along the device component path to identify other device components along the device component path to which the message is to be passed, and if the message is received from a device component at a lower network layer removing information from the information stack needed to identify a subsequent intermediate device component along the device component path to which the message is to be passed.

Still further in accordance with a preferred embodiment of the present invention the identifying step includes identifying using the removed stack information.

Additionally in accordance with a preferred embodiment of the present invention the method further includes checking at any of the device components along the device component path traversed by the message the validity of the path.

BRIEF DESCRIPTION OF THE DRAWINGS

The present invention will be understood and appreciated more fully from the following detailed description taken in conjunction with the appended drawings in which:

FIGS. 5 and 6, are, respectively, a simplified conceptual illustration of an exemplary agent and DC configuration reflecting the application of the method of FIGS. 4A and 4B, and a table of stack operations resulting from such application, both useful in understanding the method of FIGS. 4A and 4B.

DETAILED DESCRIPTION OF PREFERRED EMBODIMENTS

Figure 1:
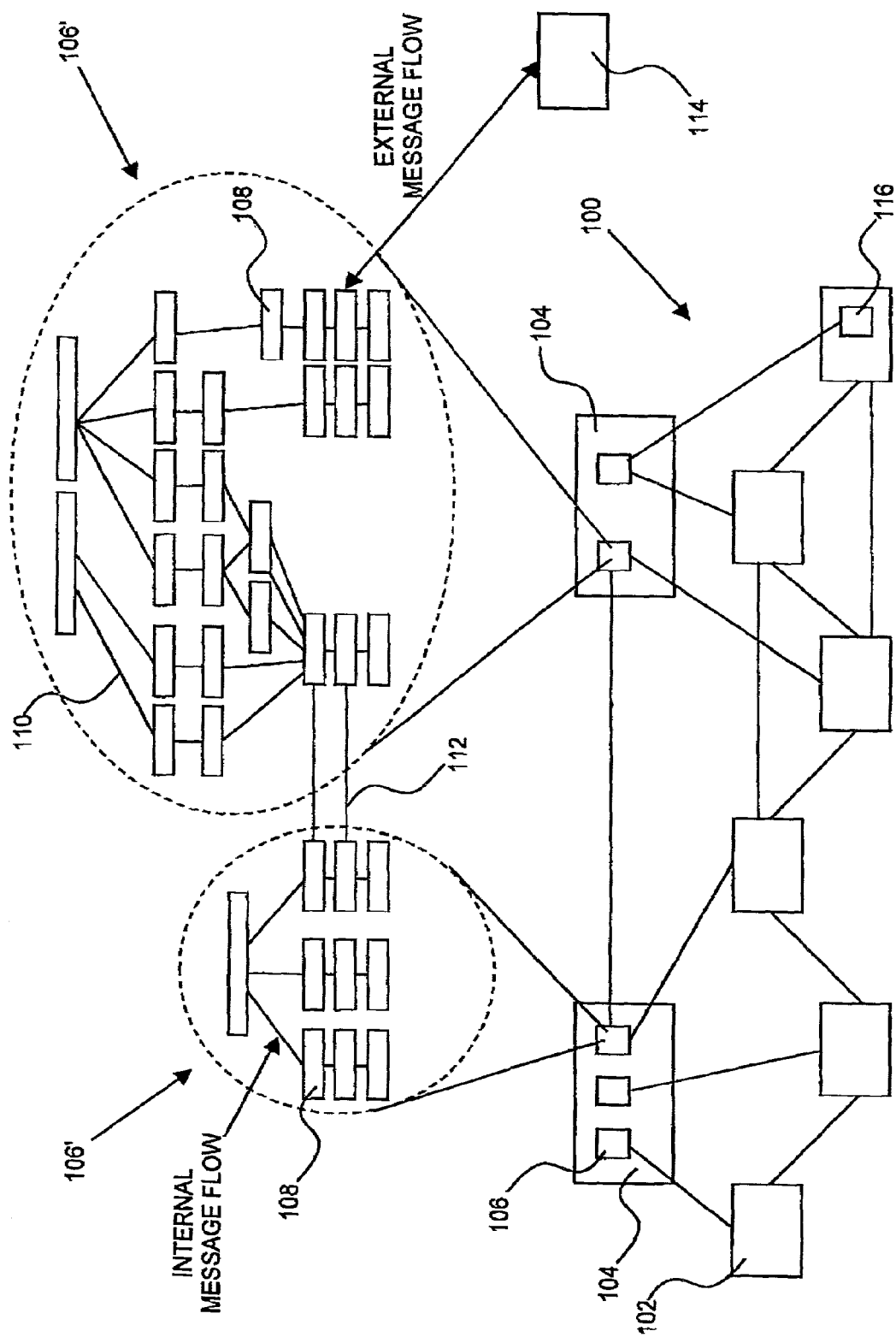
FIG. 1 is a simplified conceptual illustration of a large-scale network management system using distributed autonomous agents, useful in understanding the present invention.

Reference is now made to FIG. 1 which is a simplified conceptual illustration of a large-scale network management system using distributed autonomous agents, useful in understanding the present invention. In the system of FIG. 1 a network, generally designated 100, comprises a plurality of network elements 102, and is managed by one or more decentralized network management units 104, where each network management unit 104 sees and is responsible for only a portion of the overall network 100. A proxy or hardware embedded "agent" 106 is defined for each network element 102, with each decentralized network management unit 104 hosting those agents 106 that correspond to the portion of the network 100 for which the network management unit 104 is responsible. (Various agents 106 are shown in expanded views in dashed indicated by reference numerals 106'.)

Each agent 106 in turn comprises a plurality of device components (DCs) 108, with each DC 108 modeling one or more physical and/or logical aspects of the device 102, typically within a single network layer. For example, a DC 108 may represent an Ethernet port component, a 1483 encapsulation component, or routing functionality within a network element incorporating such functionality. DCs 108 may maintain any information concerning certain functions or aspects of the specific network element. This information may be static, dynamic, or any combination thereof. DCs 108 may communicate directly with other DCs 108, and two DCs 108 that communicate with each other are referred to as "neighbors." DCs 108 are typically arranged in a functional hierarchy within the agent 106, with a higher-level DC acting as the "parent" to one or more lower-level DC "children" with which it communicates, such as is shown at reference numeral 110. DCs that communicate with other DCs that are of the same type or perform the same function are referred to as "acquaintances," such as is shown at reference numeral 112. DCs may become "acquainted" by manually defining relationships between DCs or by having DCs send messages in order to discover topologically adjacent DCs. A DC 108 may be acquainted with another DC 108 we the same agent 106 or within another agent 106. Each DC 108 preferably uses message passing to independently communicate with any neighbor or adjacent DCs without the need to communicate directly with a centralized network management device.

DCs 108 may send/receive messages to/from neighbor DCs 108, to the network element 102 which the DC 108 models, or an external entity or device 114 (either logical or physical) that is not modeled by an agent or a DC. Information flows between DCs 108 are referred to as "internal" flows, while information flows between DCs 108 and external entities or devices 114 are referred to as "external flows". One example of an internal flow is where a device component detects a fault within its area of responsibility and reports the fault to neighboring DCs to whom such information is useful. One example of an external flow is as the result of a query of all DCs 108 in network 100 by logic external to the DCs 108 and/or the agents 106 for gathering the IP addresses of devices 102 where available. Upon receiving a message, a DC may ignore the message or may react by autonomously changing its physical or logical state and/or that of its corresponding area of functionality within the network device or send a message to itself or to a neighbor DC.

Additionally or alternatively to agents 106 being hosted by decentralized network management units 104, each network element 102 may itself host its agent and/or another device's autonomous agent, such as is shown at reference numeral 116. Thus, were each network element 102 to host its own agent, no decentralized network management units 104 would be required.

Figure 2:
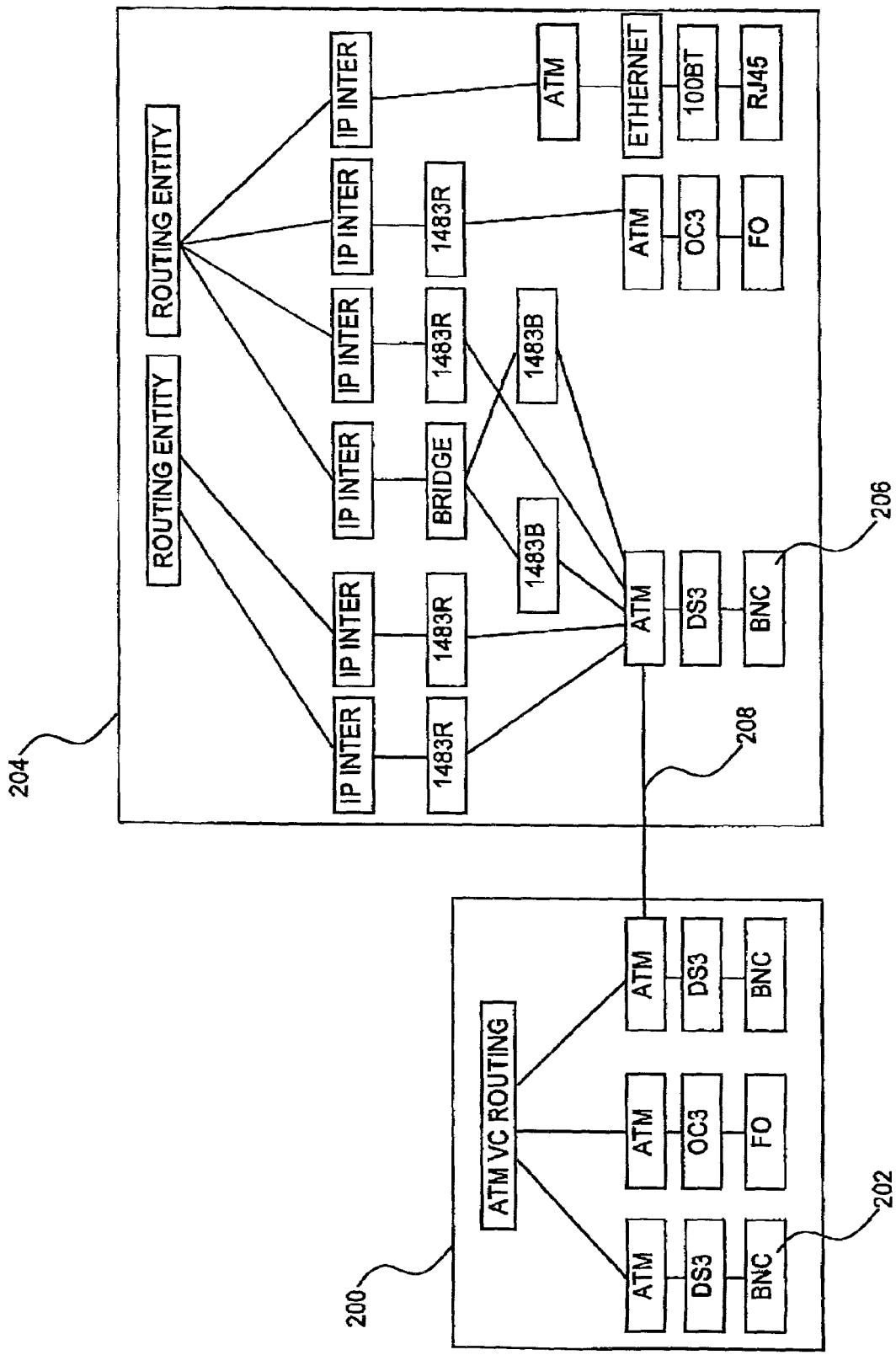
FIG. 2 is a simplified conceptual illustration of an exemplary agent and DC configuration, useful in understanding the present invention.

Reference is now made to FIG. 2 which is a simplified conceptual illustration of an exemplary agent and DC configuration, useful in understanding the present invention. In FIG. 2 an ATM switch having three ATM ports is modeled by an agent 200. Agent 200 in turn includes several DCs 202 as follows: two DCs corresponding to two BNC connectors, one DC corresponding to a fiber optic (FO) connector, two DC parents to the BNC DCs representing DS3 connectivity, one DC parent to the FO connector representing OC3 connectivity, three DCs representing the ATM network layer functionality for each of the three ATM ports, and a DC parent corresponding to the switch's ATM virtual channel (VC) routing functions. Also shown is an agent 204 having multiple DCs 206 corresponding to ATM and Ethernet connections and functionality at various network layers representing bridging, switching, and routing functions, including IP and 1483 interface protocols.

An ATM DC in FIG. 2 may, for example, maintain a list of all the VCs assigned to the ATM port it models, and may monitor the removal of a VC from the port or the allocation of a new VC to the port. An IP interface DC may, for example, contain the IP address of the physical IP interface of the device and subnet mask. Each type of DC may appear in several instances in one or more agents depending on the specific device and its configuration. Thus, in FIG. 2, since the network device represented by agent 200 has three ATM ports, agent 200 has three instances of an ATM-type DC.

The configuration of FIG. 2 may be adapted through continuous modeling to reflect the true state of the network at any given time. DCs and the links between them may be added or removed at runtime to reflect the current state of the network, allowing tracing of the data flows, states and reactions of the network. Changes in the underlying physical network may be dynamically reflected by the model by affecting the DCs and the connections between them in response to network events. For example, if a link is disconnected between two ATM ports in the network, a link 208 between the neighbor ATM DCs in agents 200 and 202 representing network layer 2 adjacency should be removed. When the link is reconnected, link 208 between the two ATM DCs may be restored.

By modeling the network elements in a computer network using interconnected agents through the DCs in them as shown in FIGS. 1 and 2, the network may be fully modeled at both the network element and network function levels. Furthermore, the model may be used to reflect at any given moment the current state of the network, with DCs autonomously supporting fault, configuration, accounting, performance, security, policy, and provisioning functions.

Figure 3:
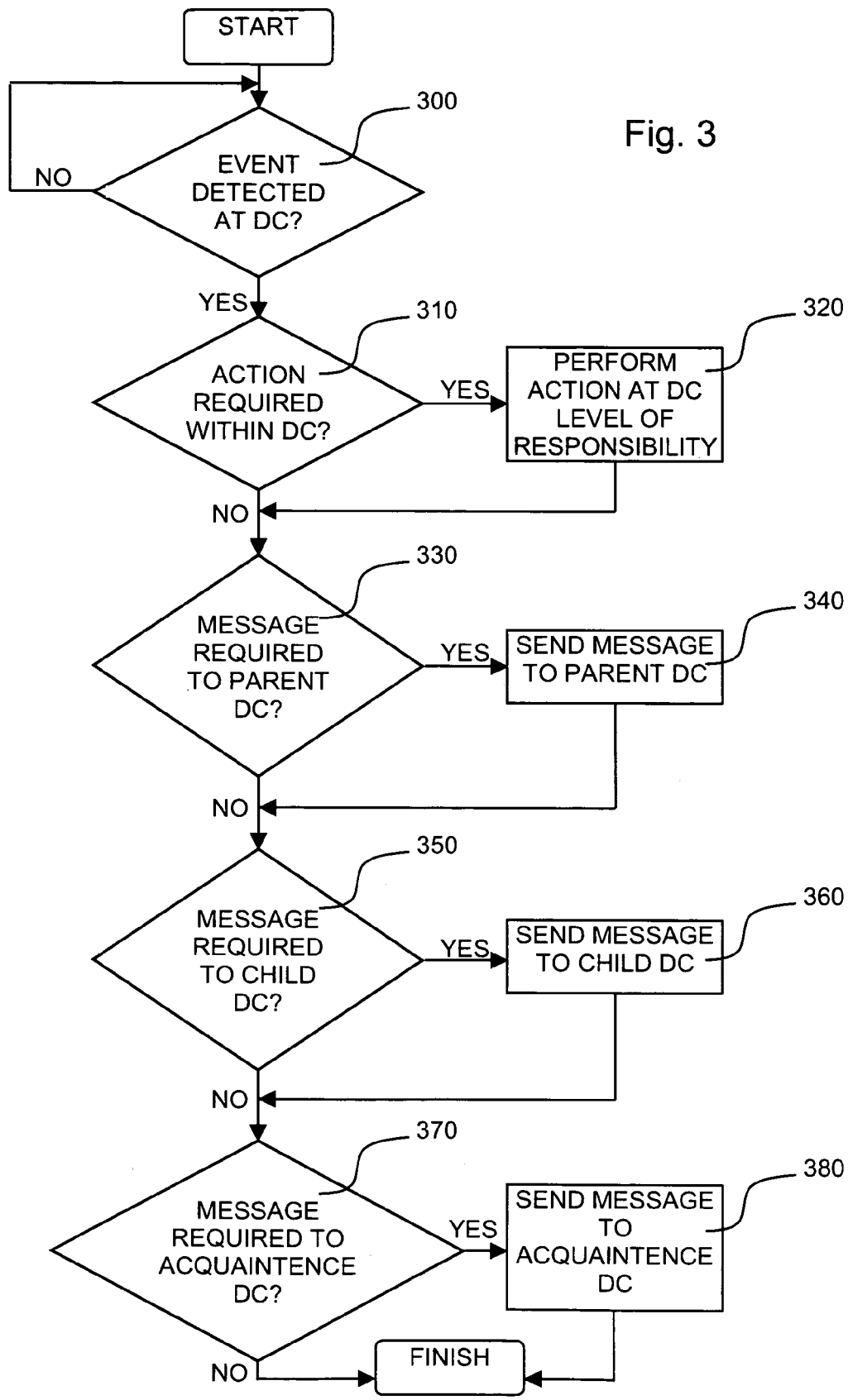
FIG. 3 is a simplified flowchart illustration of an exemplary decision-routing DC framework, useful in understanding the present invention.

Reference is now made to FIG. 3, which is a simplified flowchart illustration of an exemplary decision-routing DC framework, useful in understanding the present invention. In the method of FIG. 3 an event, such as a fault or a provisioning request, is detected at a DC (step 300). The DC then determines if it is to take any action in response to the event within the DC and/or its area of responsibility (step 310), and, if so, performs such action (step 320). The DC then determines if it is to send any messages to a parent DC (step 330), a child DC (step 350), and/or an acquaintance DC (step 370), and sends any required messages (steps 340, 360, and 380).

The concept of events and flows as described hereinabove with reference to FIGS. 1, 2, and 3, may be better understood by way of example. In what is referred to as a system-wide, top-down flow, a request arrives from an external entity and is spread from DC to DC, with each DC performing its independent computations which collectively achieve the external request. For example, the provisioning of a QoS parameter for a specific user class is signaled and synchronized for IP ToS masks between IP DCs of routers and is also carried by the routers' IP-over-ATM-interface DCs into the ATM DCs which signal and synchronize the ATM VBR parameters to the DCs of the ATM switches between the routers. In other words, for configuration of QoS between two IPs, the routers on the path between the two IPs may be configured with consistent ToS parameters. Moreover, the ATM path between every two consecutive routers in the layer 3 path may be configured with consistent VBR parameters. In a bottom-up flow, a network or DC event, including scheduled events, may propagate to other DCs which change their state and/or perform their part in a distributed algorithm. An example of such a flow is in fault detection. For example, an ATM circuit break is signaled by ATM DCs to both ends of the circuit. The signal is then propagated up the stack to IP DCs in routers whose IP-over-ATM-interface is affected by the break. The unreachable IP subnet failure is then correlated with the ATM circuit break point which initiated the flow.

An example of DC discrete message passing that provides multi-layer control signaling for use in end-to-end provisioning and fault isolation may be understood with reference to acquainted same-layer, same-technology DCs (e.g., two layer 2 ATM DCs, two layer 3 IP MPLS DCs, two Layer 5 H323 DCs, etc.) in neighboring agents representing different network elements as defined by that layer's standards. The two DCs may exchange discrete messages regarding configuration parameters, status monitoring, statistics, and accounting parameters of the layer interface as it is implemented in the two elements. Similarly, father-son DCs representing areas of responsibility in the same network element which maps functionality between upper and lower layers or functions as defined in networking standards and in the specific network element specifications (e.g., IP to Ethernet, ATM to DS3, SONET to DWDM, etc.) may exchange discrete messages regarding the way in which configuration parameters of the upper layer relate to the lower layer and visa versa (e.g., MTU, IP TOS to dot.p, etc.), regarding the way in which faults have an effect between layers (e.g., layer 2 link down, layer 3 unreachable subnet, etc.), and the way performance statistics affect the layers involved in such mapping.

It is appreciated that events and messaging of the distributed network management architecture of FIGS. 1-3 preferably adhere to networking standards. Thus, for example, two DCs on both sides of an interoperable logical link may signal each other the existence of a link failure (e.g., far-end near-end SONET) or agree on a constant configuration parameter (e.g., SONET/SDH VP/VC Mask, etc.). Similarly, parameters of an upper layer may be mapped to a lower layer in according with networking standards as deployed in the network elements, such as the way an IP switch chip is wired to an Ethernet MAC chip or the way IP software drives SONET hardware. The combination of such parent-child and acquaintance-acquaintance single-hop discrete message passing between DCs constitutes a powerful multi-layer signaling mechanism that can carry out end-to-end provisioning tasks and can deduce the root cause and the effect of a network condition.

The path that a message would take in a physical network that is modeled by the architecture described hereinabove with reference to FIGS. 1-3 may be determined within the context of the model itself prior to actual physical transmission, rather than by observing actual message traffic within the physical network. In accordance with a preferred embodiment of the present invention, a simulated network message including an information stack is sent from a source DC to a destination DC in order to discover the path that such a message would take were it to be sent from a source network device corresponding to the source DC to a destination network device corresponding to the destination DC. The source and destination DCs may each represent a network model layer, a sublayer, or a functional entity of the corresponding network device such as an IP interface of the device or a VC of a specific port in the device. Each DC receiving the simulated message is configured with the information it needs to decide where a real message with the same characteristics would be forwarded. Each DC may also be configured to place information onto the information stack as may be needed by an intermediate DC along the message path to determine, in accordance with known network routing rules, which DC to forward the message to, and may be configured to use stack information for such purposes. For example, a DC corresponding to an ATM port within a network device may be configured to place onto the stack an identifier of the VC over which the message is to be transmitted, while a DC corresponding to an ATM routing entity may be configured to use the VC identifier from the stack to identify the outgoing VC that the incoming VC is routed to and replace the incoming VC on the stack with the outgoing VC. Similarly, a DC corresponding to a routing entity may look to the stack for the current destination DC, expressed as an IP address, calculate the next hop to this destination as well as the next DC along the path, and provide this information to the next DC. Thus, the information passed from a source DC to an above, below, or adjacent DC necessarily contains enough information from the source DC to calculate the next hop. This is in conformity with well-known networking rules, where as a packet is forwarded within the network the packet is inspected at each network node which uses information from the packet together with information local to the node to determine the next hop, without requiring any data external to the current network layer.

In general, before the network message can pass from a DC at a higher network layer to a DC at a lower network layer, the stack must contain whatever information that would normally be required for message passing between network layers within the physical network, since the stack describes a packet's behavior as it would travel within the physical network. For example, when an IP packet passes from layer 3 to layer 2, the data of layer 3 is wrapped (stacked) with the layer 2 data, and the layer 2 destination becomes the new destination. In the network, moving down a layer causes the packet to be wrapped in additional information. This corresponds to pushing information onto the stack in the context of the present invention. Moving up a layer removes the wrapping from the packet. This corresponds to removing information from the stack in the context of the present invention. As a lower layer of a network device does not alter information from the upper layers, so too does a DC leave alone stack elements that belong to higher layers. Where a DC does require a stack element, the DC will typically require all stack elements above it.

Figure 4A:
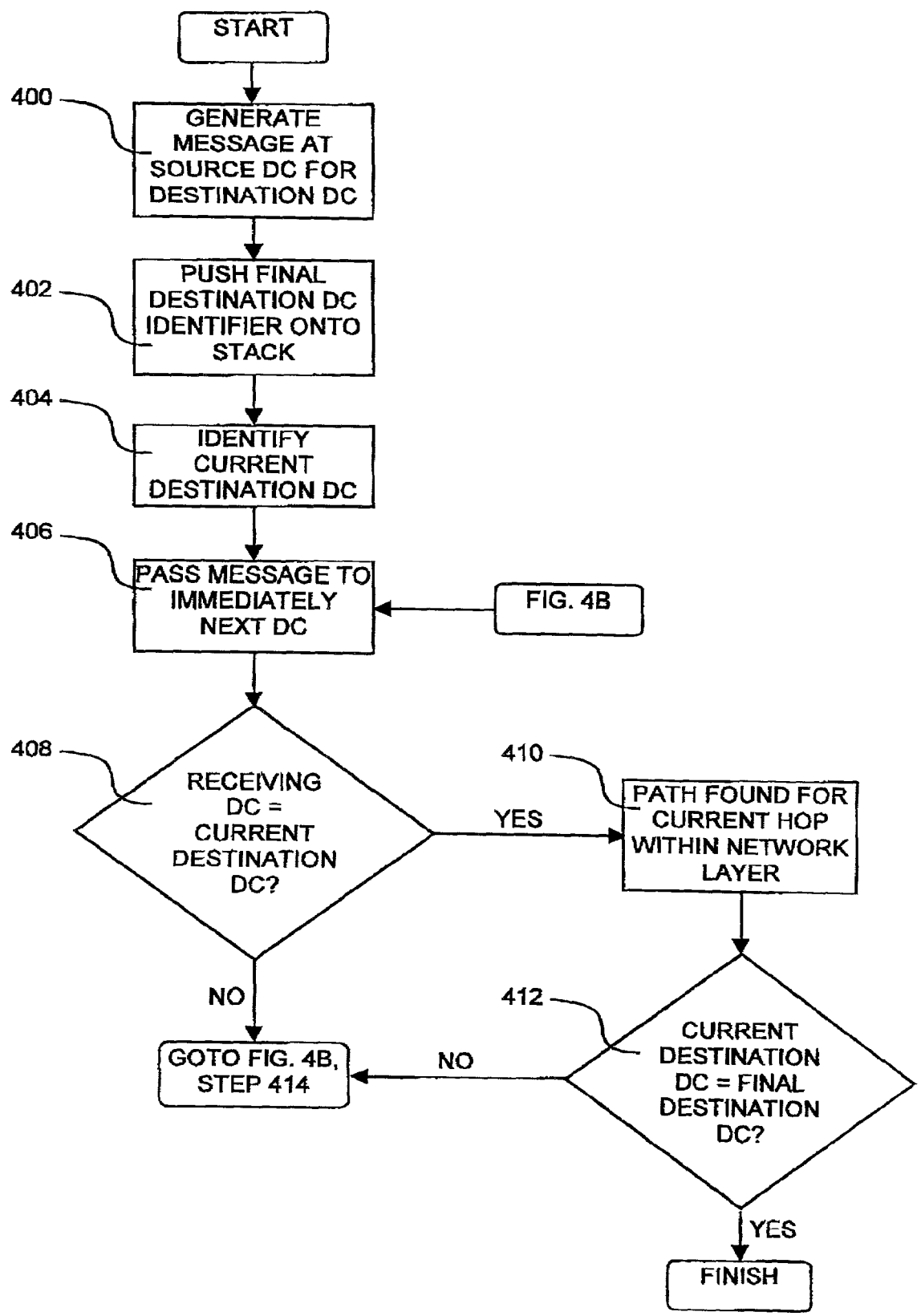
FIGS. 4A and 4B, taken together, are a simplified flowchart illustration of a method of path discovery in a distributed network management architecture, operative in accordance with a preferred embodiment of the present invention.
Figure 4B:
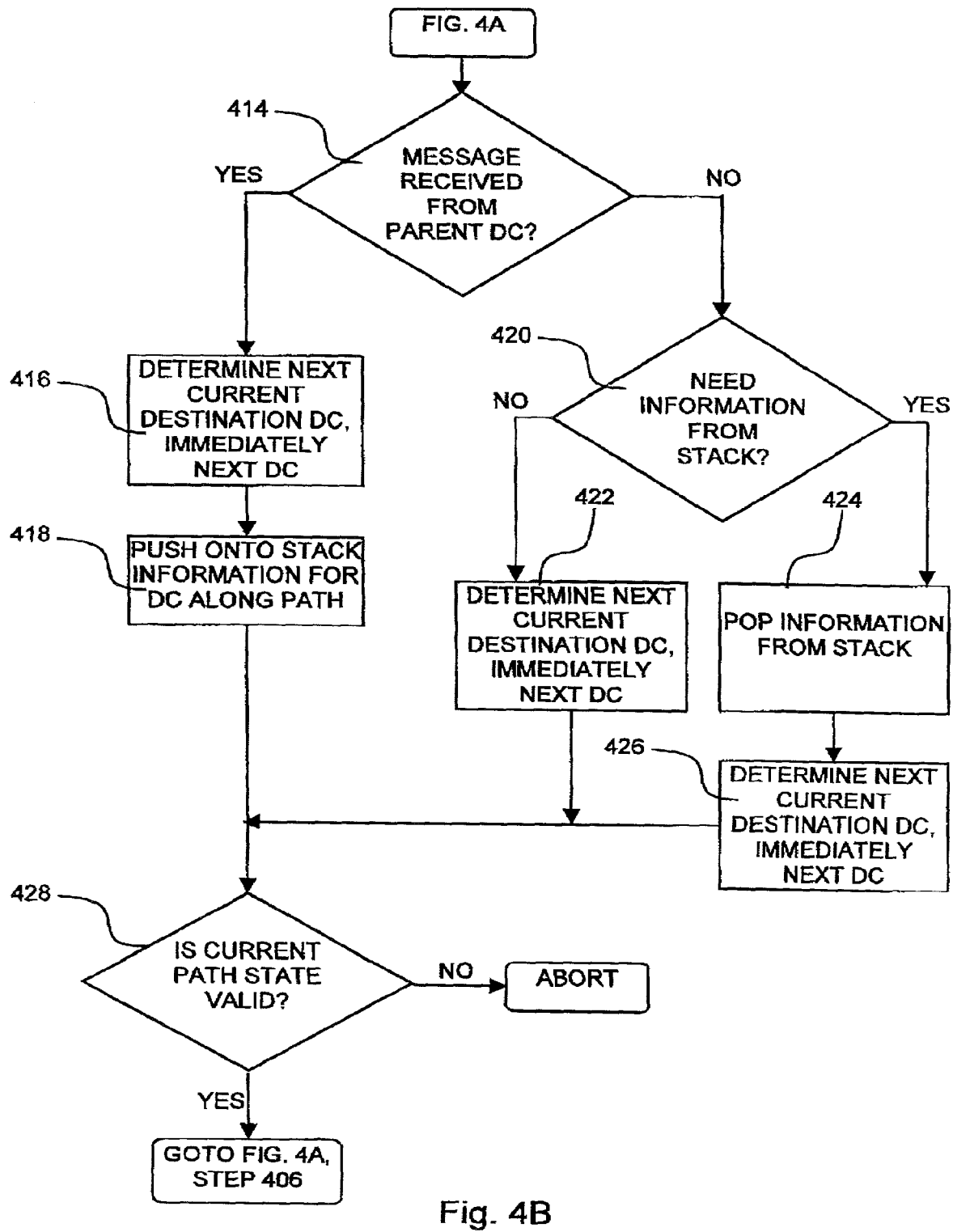

Reference is now made to FIGS. 4A and 4B, which, taken together, are a simplified flowchart illustration of a method of path discovery in a distributed network management architecture, operative in accordance with a preferred embodiment of the present invention. In the method of FIGS. 4A and 4B, a source DC generates a message that is bound for a destination DC (step 400). The message includes a stack onto which the source DC pushes an identifier identifying the destination DC, now referred to as the final destination DC (step 402). The source DC then determines the identity of a DC between the source DC and the final destination DC to which the message is to be sent using known network interlayer communication rules applicable for the source DC's area of functionality (step 404). The DC to which the message is to be sent, now referred to as the current destination DC, is the next hop of the message at the same network layer, and is therefore an acquaintance DC of the source DC. The source DC then passes the message, including its stack and current destination DC identifier, to the appropriate parent, child, or acquaintance DC of the source DC, now referred to as the receiving DC, that is the immediately next DC along the path between the source DC and the current destination DC (step 406). Upon receiving the message, the receiving DC compares the current destination DC identifier with its own identifier (step 408). If the identifiers match, then the receiving DC is the current destination DC and path discovery has been achieved for the current hop within the current network layer (step 410). If the current destination DC identifier matches the final destination DC identifier (step 412), then full path discovery has been achieved.

If the current destination DC identifier does not match the final destination DC identifier, then the receiving DC checks if the message has been received from its parent DC (step 414). If the receiving DC received the message from its parent DC, then the receiving DC determines the next current destination DC and the immediately next DC to which the message is to be sent using known network interlayer communication rules applicable for the receiving DC's area of functionality (step 416). The receiving DC then determines whether information will be needed by a DC corresponding to a network interface or layer further along the path and, if so, places the information onto the stack (step 418).

If the receiving DC did not receive the message from its parent DC, then the receiving DC checks whether or not it requires information from the stack to determine the next current destination DC to which the message is to be sent (step 420). If no information is required from the stack then the receiving DC determines the next current destination DC and the immediately next DC to which the message is to be sent using known network interlayer communication rules applicable for the receiving DC's area of functionality (step 422). If information is required from the stack to determine the next current destination DC and immediately next DC to which the message is to be sent, then the receiving DC removes the required information from the stack (step 424). The receiving DC determines the next current destination DC and immediately next DC to which the message is to be sent using the information removed from the stack in conjunction with known network interlayer communication rules applicable for the receiving DC's area of functionality (step 426).

Before forwarding the message and its stack to the immediately next DC, the receiving DC preferably checks the stack to determine whether the current path state is valid (step 428). For example, suppose a DC along the message path and corresponding to a Point-to-point Protocol over ATM networks (PPPoA) component pushed a PPPoA identifier to the stack, and a DC along the data path that receives the message is configured for PPP over Ethernet (PPPoE). When the PPPoE DC inspects the stack, it will find a PPPoA identifier and not a PPPoE identifier as expected, indicating a misconfiguration and, therefore, an invalid path. If the current path state is invalid, then the path discovery is terminated. If the current path state is valid, then processing may continue with step 406 above, with the message being forwarded to the appropriate parent, child, or acquaintance DC.

The rules for forwarding a message in accordance with the method of FIGS. 4A and 4B thus mimic the forwarding of a packet within the physical network, and may be summarized as follows:

1) If a message is received from a higher network layer:
   i) Push the current destination DC to the stack (i.e., wrap the packet received from the previous network layer)
   ii) Determine the next hop within the same network layer as the receiving DC and set it as the current destination DC
   iii) Pass the message to a child DC or to an acquaintance DC if there is no child DC
2) If a message is received from a lower network layer:
   i) Pop the current destination DC from the stack (i.e., unwrap the packet)
   ii) Compare the current destination DC with the identifier of the current DC to see if message has arrived at current destination DC
   iii) Decide which immediately next DC to pass the message to based on local information
   iv) Send the message to the next DC.
3) If a message is received from a DC within the same network layer, forward it according to networking rules.

Figure 5:
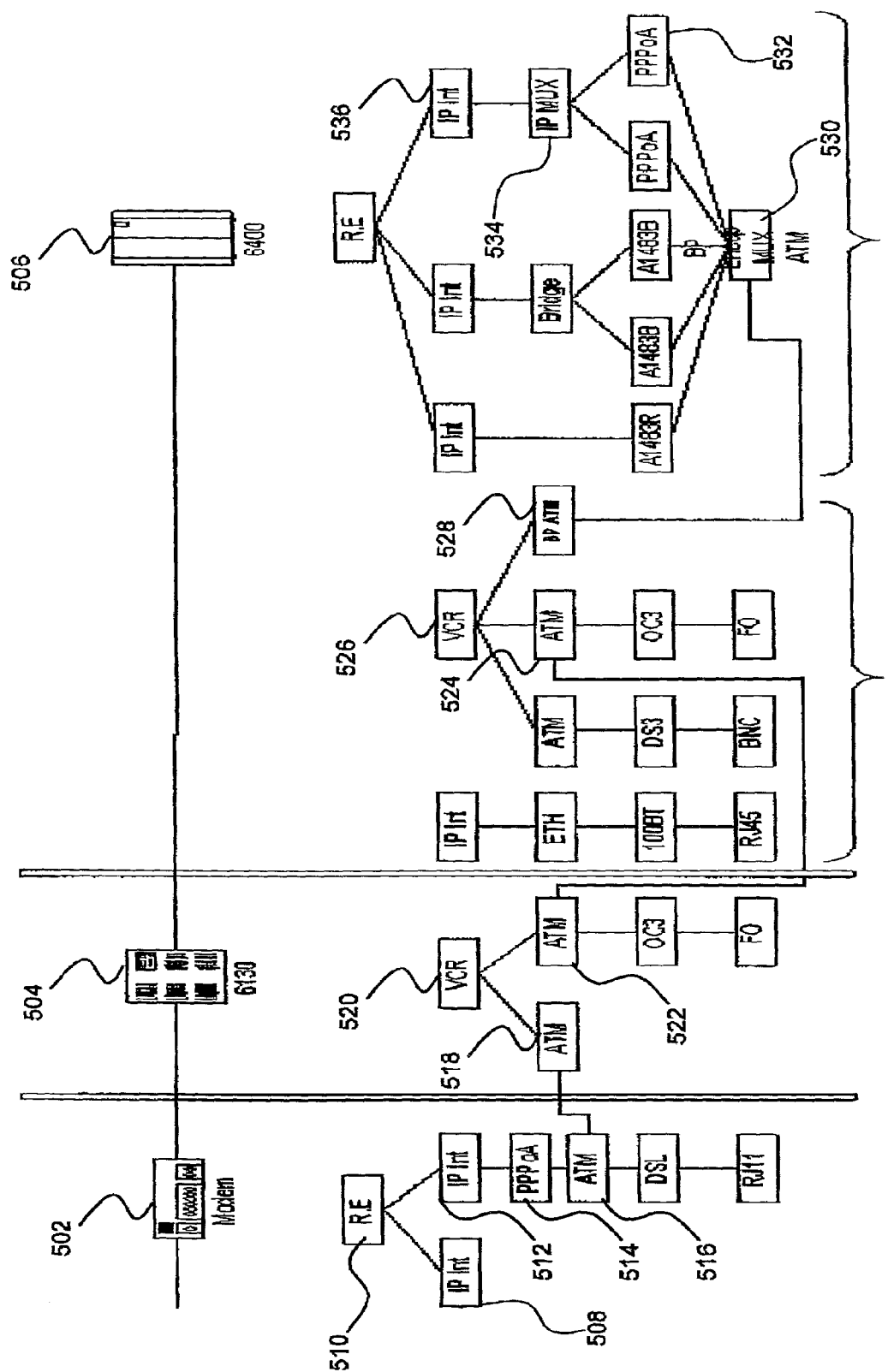

Reference is now made to FIGS. 5 and 6, which are, respectively, a simplified conceptual illustration of an exemplary agent and DC configuration reflecting the application of the method of FIGS. 4A and 4B, and a table of stack operations resulting from such application, both useful in understanding the method of FIGS. 4A and 4B. In the configuration of FIG. 5, a path between a modem 502 and a service selection gateway 506 via a DSLAM 504 is determined. Specifically, a path discovery message is sent from an IP interface DC 508 to discover the path between DC 508 and an IP interface DC 536. DC 508 sets DC 536 as the final destination DC and passes the message to a routing entity DC 510 which sets DC 536 as both the current and final destination and places an identifier for DC 536 onto the stack. The message is then forwarded to an IP interface 512 and then onto a PPPOA DC 514 which "wraps" the stack with additional information including the next hop, being DC 536, and a flag indicating passage of the message through PPPOA DC 514, and sets as the current destination DC the VC to which IP 536 is mapped, being, for example, VC 9. The message than passes unchanged via DC 516 and 518. At a VCR DC 520 the mapping of VC 9 is changed to VC 11, and the message is passed via DC 522 and 524. At a VCR DC 526 the mapping of VC 11 is changed to VC 14, and the message is passed via DC 528 and 530. At a PPPOA DC 532 the leg between PPPOA DC 514 and PPPOA DC 532 is completed, the information placed onto the stack by PPPOA DC 532 is removed from the stack, and the IP address to which VC 14 is mapped, being IP 536, is again placed on the stack. The message then passes via a DC 534 and is ultimately received by the destination DC 536.

At any point during path discovery as described above, the stack and/or the DC through which the path discovery message is passed may be preserved such that once the path discovery message is received by the destination DC the entire path may be preserved.

It is appreciated that one or more of the steps of any of the methods described herein may be omitted or carried out in a different order than that shown, without departing from the true spirit and scope of the invention.

While the present invention as disclosed herein may or may not have been described with reference to specific hardware or software, the present invention has been described in a manner sufficient to enable those skilled in the art to readily adapt commercially available hardware and software as may be needed to reduce any of the embodiments of the present invention to practice without undue experimentation and using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method of determining the path that a network message would take among network devices in a computer network the method comprising:
   providing a plurality of device components to model a physical computer network, wherein each of said device components model an aspect of a network device of said physical computer network;
   simulating sending a network message within said model of said computer network from a source device component modeling one of said network devices of said physical network to a destination device component along a device component path, wherein said simulated message only traverses any of said devices which model said network devices of said physical computer network; and
   recording the device components traversed by said simulated message within said model of said physical computer network, thereby determining said path that said network message would take among said network devices in said physical computer network as well as the validity of the path;
   wherein each of said device components are configured to use message passing to independently and directly communicate with any neighboring or adjacent one of said device components, and wherein each of said device components receiving said simulated message is configured to decide to which other of said device components would a real message with the same characteristics as said simulated message be forwarded.

2. A method according to claim 1 and further comprising providing said model comprising a plurality of agents, each agent corresponding to a different network element in said computer network comprising a plurality of network elements, and said plurality of device components (DC), each of said device components modeling at least one aspect of one of said network elements, said aspect being either of a physical and a functional characteristic of said network element, wherein each of said agents comprises a plurality of said device components, and wherein at least two of said device components within at least one of said agents are logically interconnected, each logical interconnection corresponding to either of a physical and a functional interconnection found within or between any of said network elements.

3. A method according to claim 1 wherein said simulating sending step comprises each device component along said device component path traversed by said message:
   identifying an intermediate device component along said device component path to which said message is to be passed; and passing said message and an identifier of said intermediate device component to an immediately next device component.

4. A method according to claim 3 wherein said identifying step comprises identifying in accordance with network routing rules.

5. A method according to claim 4 wherein said identifying step comprises identifying said intermediate device component within the same network layer.

6. A method according to claim 3 and further comprising:
receiving said message at said immediately next device component;
if said message is received from a device component at a higher network layer:
placing information onto an information stack as may be needed by any device component along said device component path to identify other device components along said device component path to which said message is to be passed; and
if said message is received from a device component at a lower network layer:
removing information from said information stack needed to identify a subsequent intermediate device component along said device component path to which said message is to be passed.

7. A method according to claim 6 wherein said identifying step comprises identifying using said removed stack information.

8. A method according to claim 1 and further comprising checking at any of said device components along said device component path traversed by said message the validity of said path.

* * * * *